United States Patent [19]

Usami

[11] Patent Number: 5,748,342
[45] Date of Patent: May 5, 1998

[54] IMAGE PROCESSING APPARATUS AND METHOD

[75] Inventor: Akihiro Usami, Yokohama, Japan

[73] Assignee: Canon Kabushiki Kaisha, Tokyo, Japan

[21] Appl. No.: 421,866

[22] Filed: Apr. 14, 1995

[30] Foreign Application Priority Data

Apr. 18, 1994 [JP] Japan .................................. 6-079025

[51] Int. Cl.$^6$ ................................ H04N 1/46; G03F 3/10
[52] U.S. Cl. ..................... 358/500; 358/504; 358/523; 358/527
[58] Field of Search ................................ 358/527, 500, 358/518, 523, 524, 520, 521, 504; 382/166, 167; 346/135.1, 136; 347/14, 105, 19; 395/131, 140

[56] References Cited

U.S. PATENT DOCUMENTS

| 4,731,662 | 3/1988 | Udagawa et al. | 358/530 |
|---|---|---|---|
| 4,758,885 | 7/1988 | Sasaki et al. | 358/520 |
| 4,788,563 | 11/1988 | Omo et al. | 346/136 |
| 5,084,758 | 1/1992 | Danzuka et al. | 358/296 |
| 5,126,838 | 6/1992 | Ohsawa et al. | 358/500 |
| 5,243,414 | 9/1993 | Dalrymple et al. | 358/500 |
| 5,257,097 | 10/1993 | Pineau et al. | 358/527 |
| 5,299,291 | 3/1994 | Ruetz | 358/518 |
| 5,307,182 | 4/1994 | Malz | 358/518 |
| 5,313,291 | 5/1994 | Appel et al. | 358/518 |
| 5,317,425 | 5/1994 | Spence et al. | 358/523 |
| 5,383,055 | 1/1995 | Sasanuma et al. | 358/521 |
| 5,416,890 | 5/1995 | Beretta | 395/131 |
| 5,422,739 | 6/1995 | Usami et al. | 358/518 |
| 5,444,544 | 8/1995 | Oka et al. | 358/253 |
| 5,463,480 | 10/1995 | Macdonald et al. | 358/518 |
| 5,481,655 | 1/1996 | Jacobs | 358/523 |
| 5,604,610 | 2/1997 | Spaulding et al. | 358/523 |

FOREIGN PATENT DOCUMENTS

| 0448250 | 9/1991 | European Pat. Off. | H04N 1/46 |
|---|---|---|---|
| 0528358 | 2/1993 | European Pat. Off. | H04N 1/46 |
| WO92-05470 | 4/1992 | WIPO | G03B 27/73 |

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

A CPU performs color space compression of an input image, and also performs masking processing associated with image formation. A plurality of images having undergone different color space compression processes are sent to a monitor via a video interface. The monitor displays a plurality of images on one screen. The user selects an image having a desired color appearance from the plurality of images displayed on the monitor. The CPU converts the color reproduction range of the input image into the color reproduction range of the selected image, and supplies the resultant data to a printer via a printer interface. With this processing, a preview function is provided for forming an image having a desired color appearance.

29 Claims, 14 Drawing Sheets

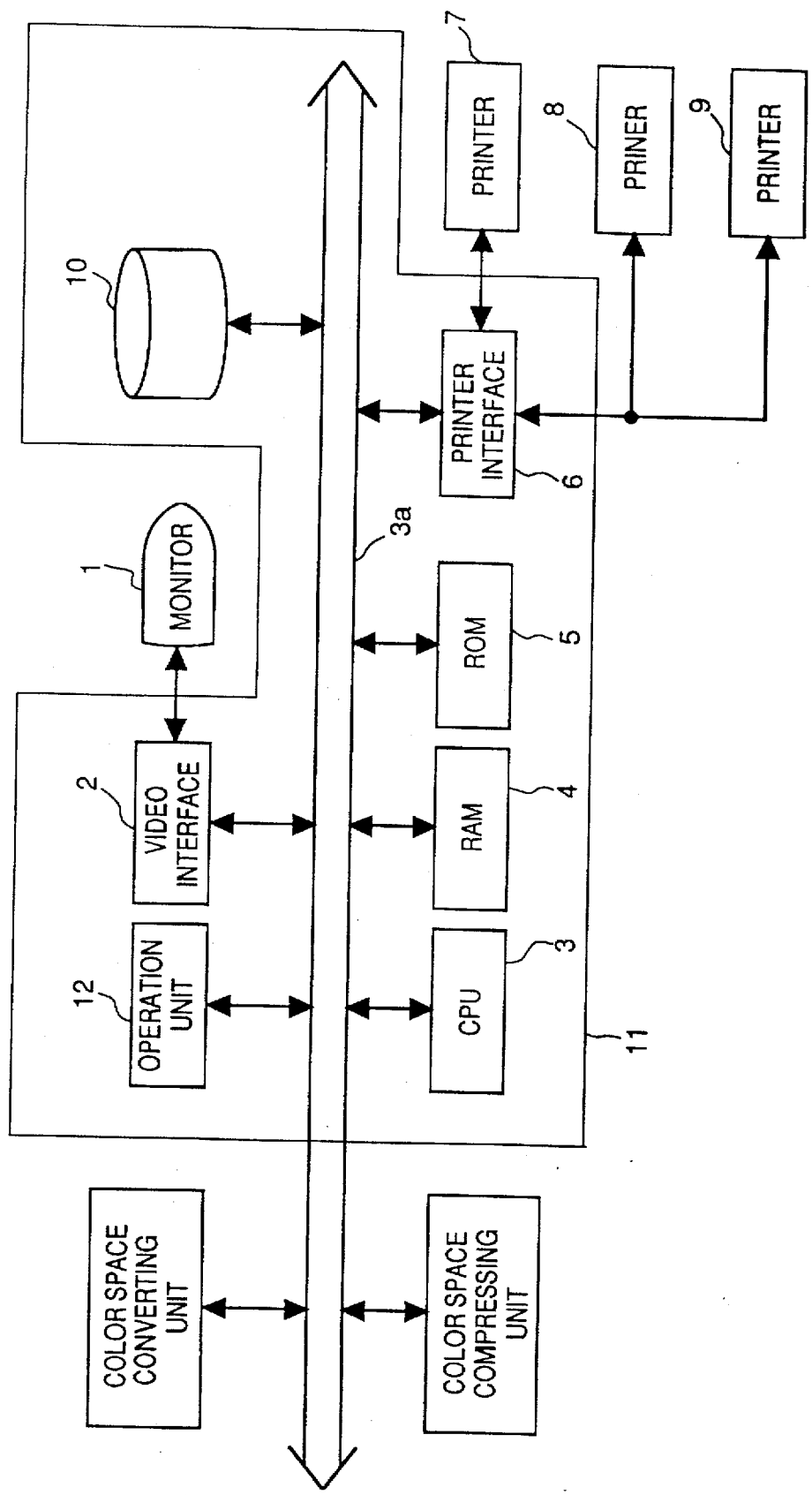

FIG. 15
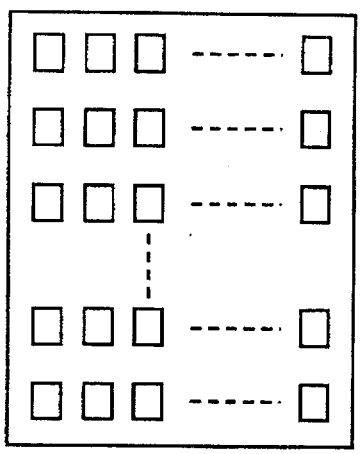
FIG. 16
|  | Y | M | C | Bk |
|---|---|---|---|---|
| 1 | 0 | 0 | 0 | 0 |
| 2 | 32 | 0 | 0 | 0 |
| 3 | 64 | 0 | 0 | 0 |
| 4 | 96 | 0 | 0 | 0 |
| 5 | 128 | 0 | 0 | 0 |
| 6 | 160 | 0 | 0 | 0 |
| 7 | 192 | 0 | 0 | 0 |
| 8 | 224 | 0 | 0 | 0 |
| 9 | 255 | 0 | 0 | 0 |
| 10 | 255 | 32 | 0 | 0 |
| 11 | 255 | 64 | 0 | 0 |
| ⋮ | ⋮ | ⋮ | ⋮ | ⋮ |
| 6561 | 255 | 255 | 255 | 255 |
FIG. 17
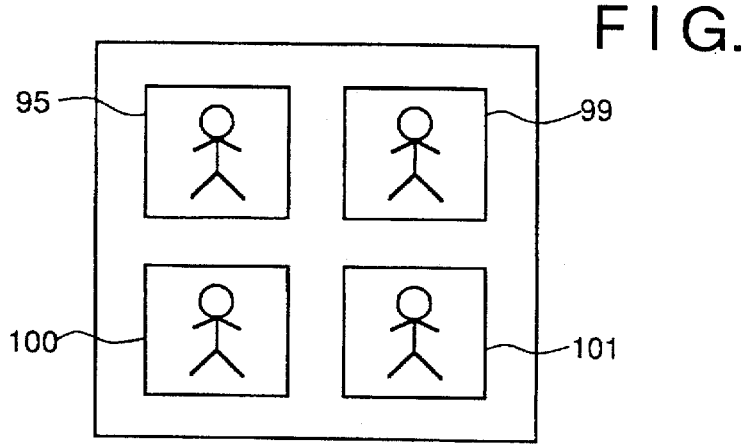

| PREVIEW PROCESS MODE | TYPE | COLOR SPACE COMPRESSION PROCESS | PRINTER TO BE USED |
|---|---|---|---|
| IMAGE 1 | ORIGINAL | | |
| IMAGE 2 | PREVIEW IMAGE | NO | PRINTER 7 |
| IMAGE 3 | PREVIEW IMAGE | ALGORITHM A | PRINTER 7 |
| IMAGE 4 | PREVIEW IMAGE | ALGORITHM B | PRINTER 7 |

IMAGE PROCESSING APPARATUS AND METHOD

BACKGROUND OF THE INVENTION

The present invention relates to an image processing apparatus and method and, more particularly, to an image processing apparatus such as an image forming apparatus which allows a user to preview an image to be formed before it is formed, and a method therefor.

Some image forming apparatuses are designed to display an image on a monitor before a corresponding color image is output, i.e., can perform a so-called preview operation. In this preview operation, R, G, and B signals obtained by inverting Y, M, and C signals for forming an image are displayed on the monitor. For example, such preview operations include the following operations: allowing the user to check the type of an image to be output, e.g., to check whether the image is an image of a flower or human figure; displaying an image portion exceeding the color reproduction range of an image forming apparatus by, e.g., painting it in a specific color (e.g., gray); and allowing the user to check the color of an image to be formed.

The following problems, however, are posed in the above prior arts.

Users normally wish to use a preview function as a means of forming an image having a desired color appearance.

In many cases, however, even colors which can be displayed on a monitor exceed the color reproduction range of an image forming apparatus especially in forming artificially colored images such as computer graphics and illustrations because of the difference between the color reproduction range of the monitor and that of the image forming apparatus. Therefore, colors cannot be faithfully reproduced, and the resultant image has a color appearance different from a desired one.

In addition, checking of the type of an image or painting of a portion outside a color reproduction range, as in the prior art, alone cannot provide an image having a desired color appearance, even though such operation can inform the user as to the presence of the problem. That is, the above problem is not solved in the prior art.

Furthermore, with the conventional preview function, the user can check the colors of an image to be formed. If, however, the user is not satisfied with the colors, he/she does not know which kind of image processing should be performed. Moreover, there are other problems with which an image forming apparatus alone cannot cope.

SUMMARY OF THE INVENTION

The present invention has been made to solve the above problems, and has as its object to provide a preview function for forming an image having a desired color appearance.

More specifically, it is an object of the present invention to provide a preview function for forming an image having a color appearance desired by a user by simultaneously outputting images, as visually recognizable image data, obtained by performing different color space processes for the same input image data.

It is another object of the present invention to provide a preview function for forming an image having a color appearance desired by a user by simultaneously outputting images, as visually recognizable image data, obtained by performing preview processes corresponding to different image forming apparatuses with respect to the same input image data.

In order to achieve the above objects, the present invention has the following arrangement.

An image processing apparatus according to the present invention is characterized as comprising color space processing means for performing a color space process for input image data, and first output means for simultaneously outputting images, as visually recognizable image data, obtained by the color space processing means upon performing different color space processes for the same input image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1B is a block diagram showing the arrangement of an image processing apparatus according to an embodiment of the present invention;

FIG. 3 is a view showing an example of the color reproduction range of a printer or the like;

FIG. 15 is a view showing patches printed to set a table in a four-dimensional LUT;

FIG. 16 is a view showing combinations of Y, M, C, and Bk data for forming patches having different colors;

FIG. 17 is a view showing an example of how a preview operation is performed according to a modification of the embodiment;

DETAILED DESCRIPTION OF THE PREFERRED EMBODIMENTS

<First Embodiment>

An image processing apparatus according to an embodiment of the present invention is described in detail below with reference to the accompanying drawings.

The following is a case wherein the present invention is applied to an image processing apparatus which is independent of a color printer or an image scanner. However, the present invention is not limited to such, and can be applied to an image processing unit incorporated in a color printer or a color copying machine.

Figure 1A:
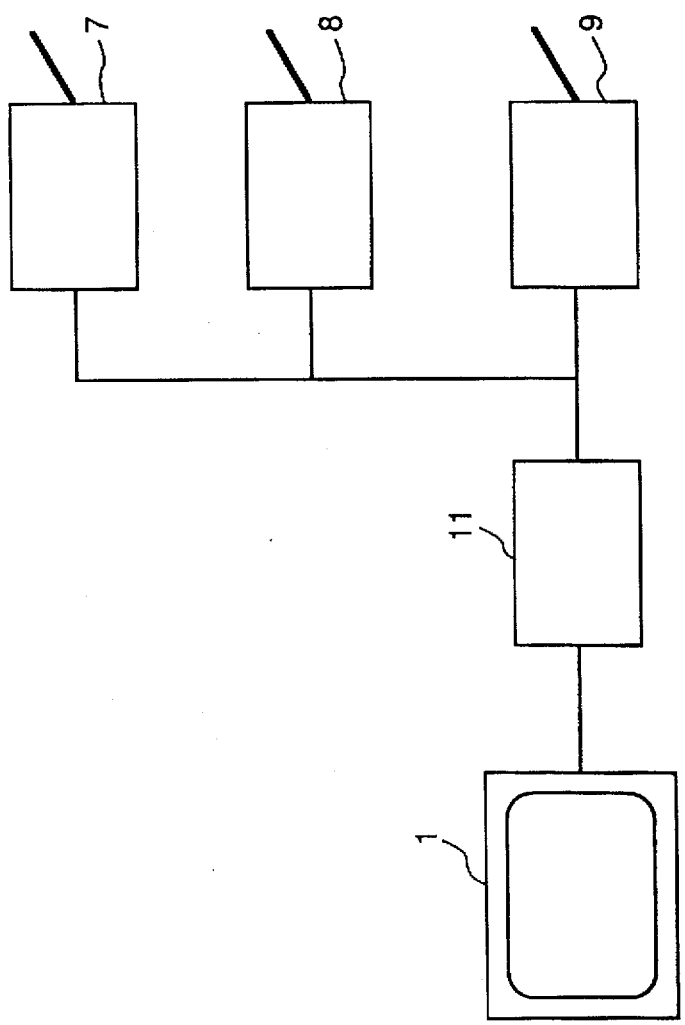
FIG. 1A is a block diagram showing the arrangement of an image forming system including an image processing apparatus according to an embodiment of the present invention.

FIG. 1A is a block diagram showing the arrangement of an image forming system including an image processing apparatus according to an embodiment of the present invention. FIG. 1B is a block diagram showing the arrangement of the image processing apparatus of this embodiment. An image processing apparatus 11 of this embodiment is described with reference to FIGS. 1A and 1B.

As shown in FIG. 1A, in the system according to this embodiment, a monitor 1 and printers 7 to 9 are connected to an image processing apparatus 11.

Reference numeral 3 denotes a CPU, which controls other blocks (to be described later) via a bus 3a and executes processing (to be described later) by using a RAM 4 as a work memory in accordance with programs stored in a ROM 5.

Reference numeral 2 denotes a video interface for interfacing with the monitor 1; and 6, a printer interface for interfacing with the printers 7 to 9. Note that the three printers have different color reproduction ranges. Each printer performs predetermined processes such as logarithmic conversion, masking correction, UCR, and gamma correction with respect to R, G, and B image signals sent from the image processing apparatus 11, and forms a color image on a recording sheet. In this embodiment, these image processes may be performed by the image processing apparatus 11 to output C, M, Y, and K image signals. In this case, each of the printers 7 to 9 forms an image on the basis of input image signals. Although FIGS. 1A and 1B show one monitor and three printers, this embodiment is not limited to such, and arbitrary numbers of monitors, printers, scanners, and the like can be connected to the image processing apparatus 11.

Reference numeral 10 denotes a hard disk, which is used to store color reproduction range data of the printers 7 to 9 and the monitor 1, a profile including programs including a color space compression algorithm, and the like in advance. Note that these data and programs may be stored in the ROM 5 and are used by the CPU 3 via the bus 3a. The hard disk 10 may be incorporated in this embodiment or may be connected, as an external storage unit, to the embodiment. In addition, an image forming apparatus may hold the profile and transfer it to the image processing apparatus 11 via the printer interface 6 as needed.

Reference numeral 12 denotes an operating unit, which is used by the user to select a desired process.

Figure 2A:
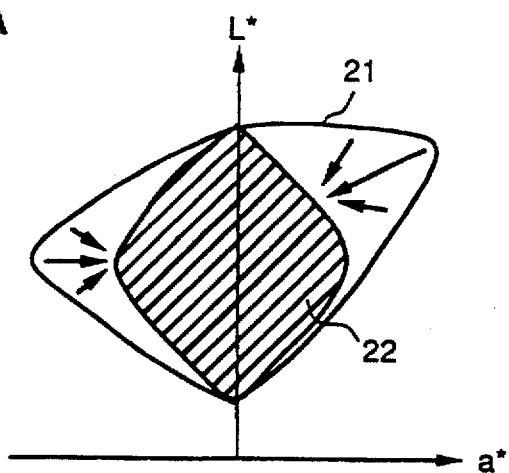
FIGS. 2A and 2B are views for explaining an example of color space compression in the embodiment.
Figure 2B:
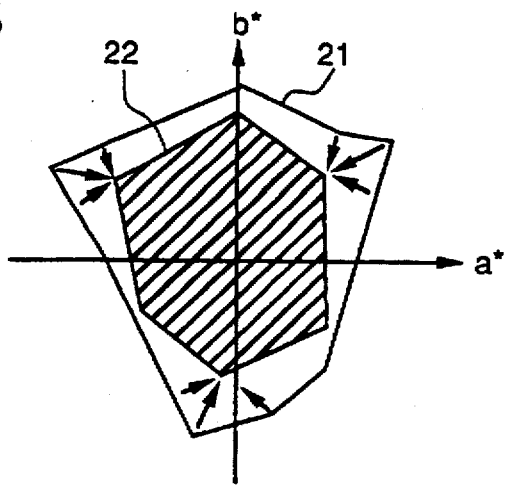

FIGS. 2A and 2B are views for describing an example of color space compression, in which color reproduction ranges 21 and 22 of a monitor and a printer are respectively expressed by L*a*b* color spaces. FIG. 2A shows an L*a* plane. FIG. 2B shows an a*b* plane. Note that L* represents lightness; and a* and b*, color differences. On the a*b* plane, the saturation increases with an increase in the distance of a given point from the origin, and the hue changes as the point rotates about the origin.

In general, the color reproduction range of a monitor is wider than that of a printer. When colors outside the color reproduction range 22 are printed out, gradation is lost, and all the colors are mapped on the contour, i.e., the peripheral edge, of the color reproduction range 22. Therefore, a color outside a color reproduction range may be printed out as a color having a color appearance different from that in the color reproduction range.

Therefore, a desired color space compression process is performed for input image data in such a manner that all input colors including colors outside a color reproduction range are converted into colors in the color reproduction range, which are similar in color appearance to the original colors. With this process, the color appearance of an image to be actually formed can be expressed as accurately as possible.

Note that the respective types of apparatuses have unique color reproduction ranges, and the printers 7, 8, and 9 have different color reproduction ranges.

Figure 3:
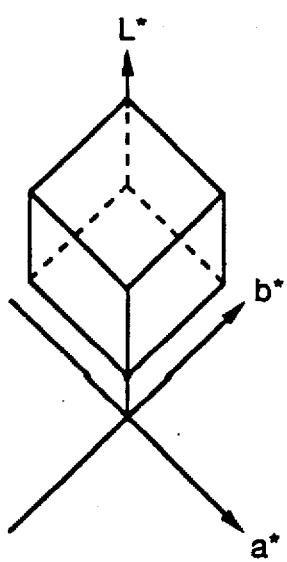
Figure 4A:
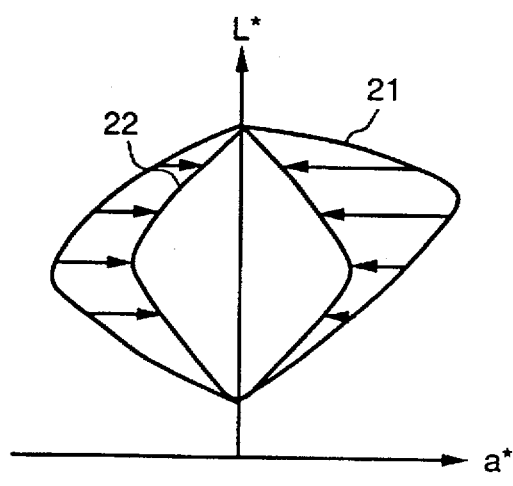
FIGS. 4A and 4B are views showing an example of a color space compression algorithm.
Figure 4B:
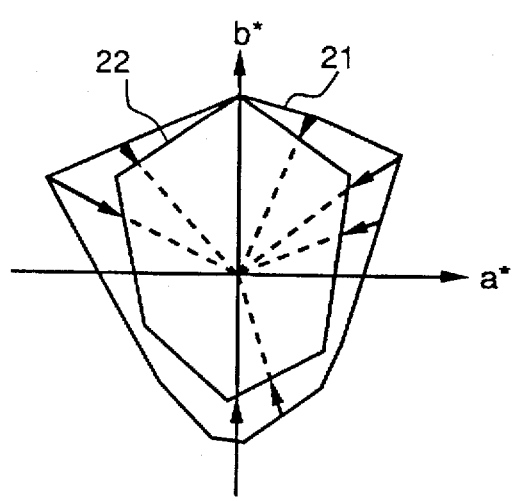

The color reproduction range of a printer or the like has a distorted dice-like shape like the one shown in FIG. 3. A case wherein eight data at the eight vertexes of the color reproduction range are used as color reproduction range data is described below. However, the present invention is not limited to this, and more data can be used. In this case, the data at the eight vertexes correspond to the outermost colors of R, G, B, C, M, Y, W, and K, i.e., the colors having the highest saturations among the corresponding colors. Various color space compression algorithms may be used. An algorithm for color space compression on the peripheral edge of a color reproduction range with constant lightness as shown in FIG. 4A is referred to as algorithm A hereinafter. An algorithm for color space compression on the peripheral edge of a color reproduction range with constant hue as shown in FIG. 4B is referred to as algorithm B hereinafter. Another algorithm is used for color space compression within a color reproduction range. Each color space compression algorithm has its own characteristic features, and each processing result has a color appearance corresponding to individual characteristic features.

Figure 5:
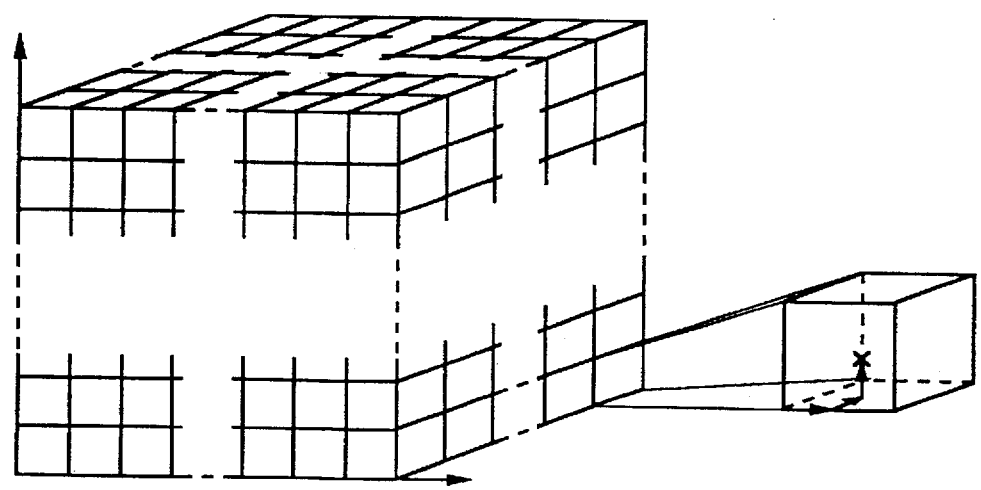
FIG. 5 is a view showing a three-dimensional look-up table.

The CPU 3 executes color space compression by using a three-dimensional look-up table like the one shown in FIG. 5 and interpolation data obtained from the look-up table as needed.

Figure 6:
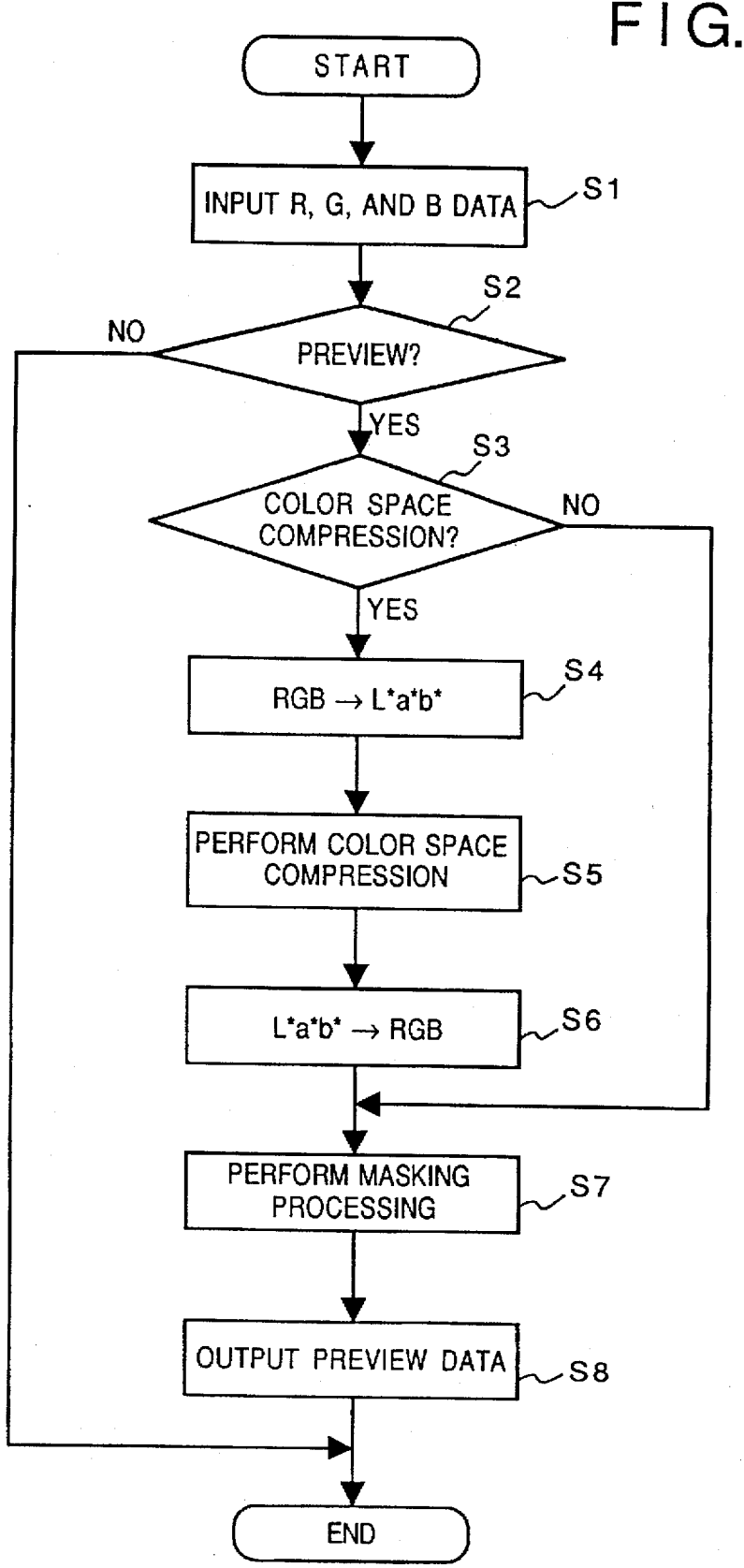
FIG. 6 is a flow chart showing a procedure for a preview operation according to the embodiment.

FIG. 6 is a flow chart showing a procedure for a preview operation.

Referring to FIG. 6, when R, G, and B image data are input from an image scanner or image memory (not shown) in step S1, the CPU 3 outputs the input image data to the monitor 1 via the video interface 2, and checks in step S2 whether to perform a preview operation. If a preview operation is not performed, the processing is terminated, and the input image data are supplied to one of the printers 7 to 9 via the printer interface 6. Note that the user can determine whether to perform a preview operation, or can set a specific printer to which image data are to be supplied, or a specific kind of preview operation to be performed, in advance, through the operation unit 12. Alternatively, the user can perform such a setting operation through the operation unit 12 every time image data are input.

If a preview operation is to be performed, it is checked in step S3 whether color space compression is performed. If NO in step S3, the flow jumps to step S7. If YES in step S3, the color space of the input data is converted in step S4. In step S5, the above-described color space compression is performed in accordance with a selected printer. In step S6, the color space of the image data is restored to the initial color space.

In step S7, masking processing for the image data is performed on the basis of data associated with the characteristics of the printer and the monitor, which are read out from the hard disk 10, so as to emulate image processing to be performed by the printer. In step S8, preview data is output to the monitor 1 via the video interface 2. Thereafter, the processing is terminated. Note that the data on the printer, read out from the hard disk 10, is data set by the user and associated with the printer selected to perform an output operation.

Figure 7:
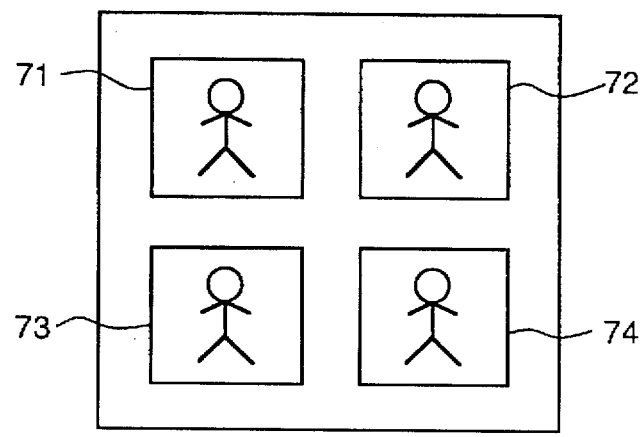
FIG. 7 is a view showing an example of how a preview operation is performed in the embodiment.

In this manner, preview images are displayed on the monitor 1. In this embodiment, the following four images are output: an image indicating the input image data as they are; an image having undergone no color space compression; an image having undergone color space compression based on, e.g., algorithm A selected from a plurality of algorithms; and an image having undergone color space compression based on algorithm B. As shown in FIG. 7, these four images are displayed on the monitor 1 upon compression and synthesis. More specifically, after the non-compressed image data are output in step S8, the processing from step S4 to step S8 is repeated twice to output image data having undergone color space compression and masking processing in accordance with the set printer. These four image data are stored at predetermined positions in a video memory incorporated in the video interface 2 or the monitor 1, and displayed in the manner shown in FIG. 7. Referring to FIG. 7, reference numeral 71 denotes an image indicating the input image data as is; 72, an image having undergone no color space compression; 73, an image having undergone color space compression based on algorithm A; and 74, an image having undergone color space compression based on algorithm B.

The image 71 is an original image. The image 72 is an image output from the printer according to a conventional method without performing any processing for input image data outside the color reproduction range. The images 73 and 74 are those which are output from the printer on the basis of image data obtained by converting input image data into image data within the color reproduction range.

In this case, a plurality of algorithms are prepared for a color space compression process for the following reason. Since an object for a color space compression process is an ambiguous object called a color appearance, an optimal color space compression process cannot always be specified to one process.

That is, an optimal result varies depending on the type and application purpose of an input image such as a character or photographic image.

In this embodiment, therefore, the images 71 and 72 are displayed together with the images 73 and 74 having undergone different color space compression processes to allow the user to compare them, thereby allowing the user to easily select an optimal image in accordance with an application purpose.

Figure 21:
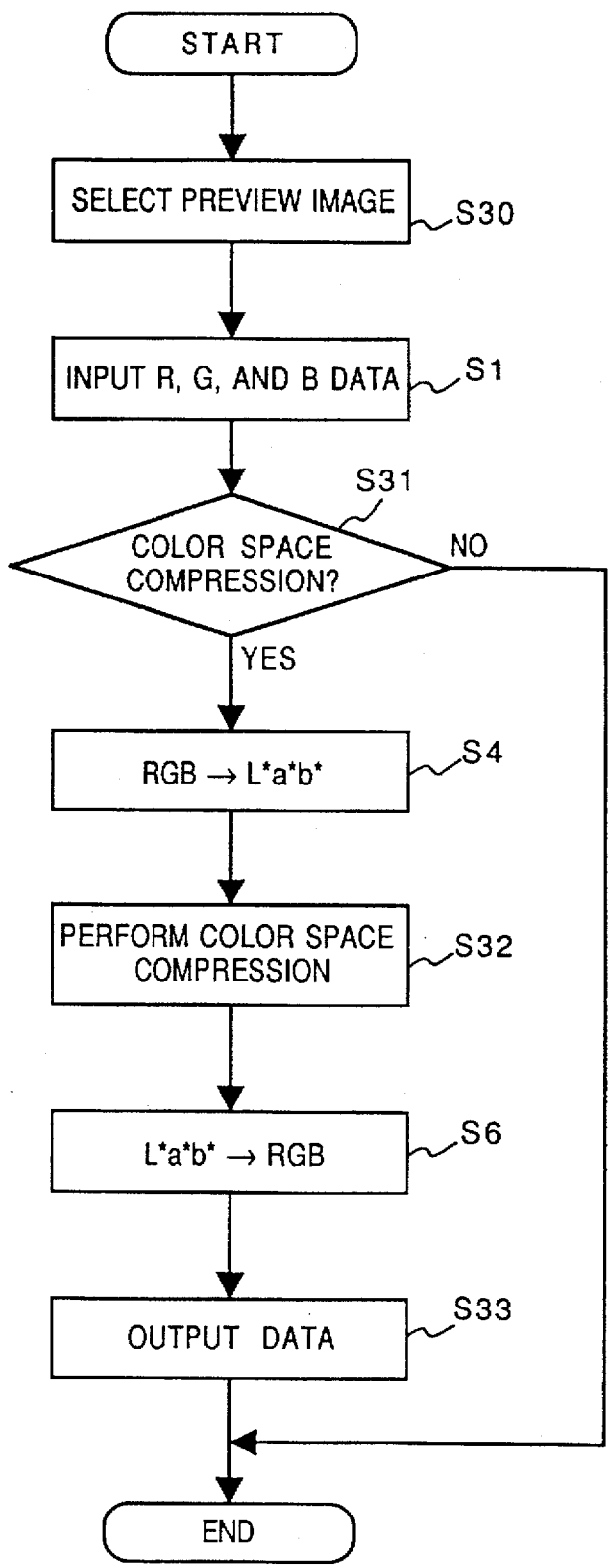
FIG. 21 is a flow chart showing a procedure for selecting a preview and obtaining a printer output on the basis of preview images.

FIG. 21 is a flow chart showing a procedure for selecting a preview image, performing processing on the basis of the selected image, and outputting the resultant data to a printer.

Note that the same reference symbols in FIG. 21 denote the same processes as in FIG. 6.

In step S30, the user selects a desired image from multi-synthesized preview images through the operation unit 12. In step S1, R, G, and B data are input. In step S31, it is checked, on the basis of the preview image selected in step S30, whether a color space compression process is performed. If color space compression is performed, the R, G, and B data are converted into L*a*b* data in step S4. In step S32, a color space compression process corresponding to the preview image selected in step S30 is performed. In step S6, the L*a*b* data are converted into R, G, and B data. In step S33, the R, G, and B data are output to the printer.

If it is determined step S31 that a color space compression process has not been performed, the R, G, and B data are output to the printer without performing any color space compression process, in step S33.

More specifically, the user notifies the CPU 3 of the selected image by operating the operation unit 12. Upon this notification, the CPU 3 performs a process based a color space compression algorithm corresponding to the selected image with respect to the again loaded R, G, and B image data, and outputs the resultant image to the set printer via the printer interface 6. Therefore, an image formed by the printer has a color appearance selected by the user.

As described above, according to this embodiment, the user can compare a plurality of preview images obtained by performing different color space compression processes (designed for the same printer) for an image to be formed. Therefore, in order to form an image having a desired color appearance, the user selects whether to perform color space compression, and also selects an algorithm when color space compression is to be performed.

<Modification>

Figure 8:
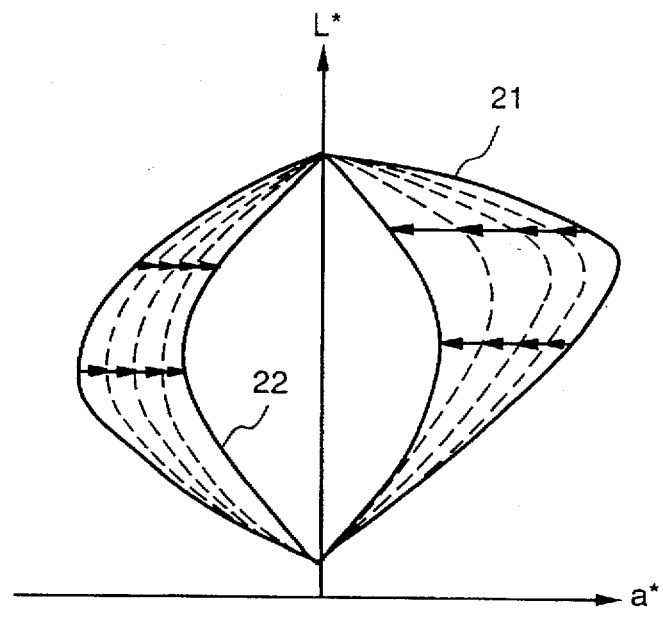
FIG. 8 is a view showing an example of color space compression performed when parameters for a color space compression algorithm are changed.
Figure 9:
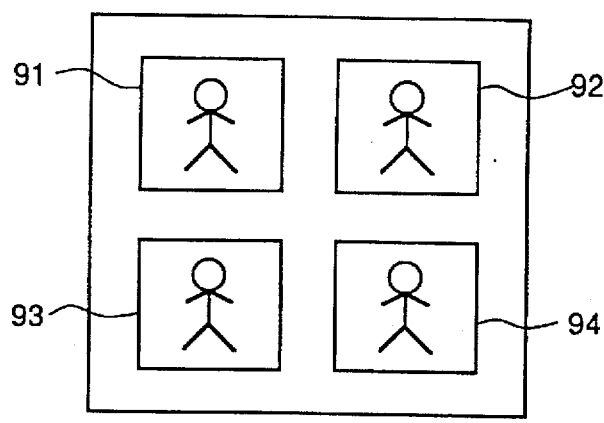
FIG. 9 is a view showing an example of how a preview operation is performed in the embodiment.

In the first embodiment described above, images obtained by changing parameters in accordance with a selected color space compression algorithm are also displayed. FIG. 8 shows an example of color space compression performed by changing parameters. In this case, the compression level is changed in four steps by changing the parameters. As shown in FIG. 9, images having undergone this four-step color space compression are displayed on the monitor 1. Referring to FIG. 9, reference numerals 91 to 94 respectively denote images having undergone a four-step color space compression. The user selects a desired image from the images displayed in this manner. With this operation, the user obtains an image having a more preferable color appearance.

In addition, a plurality of images compressed at different compression ratios without changing the characteristics of color space compression are displayed so that the user can select a desired compression ratio.

Assume that the color reproduction range of an image forming apparatus changes with time or environmental changes to differ from a set color reproduction range, so that the effect of a color space compression process is reduced and a desired image is not output. In this case, the user outputs a desired image by changing the compression level to a desired level.

Figure 10:
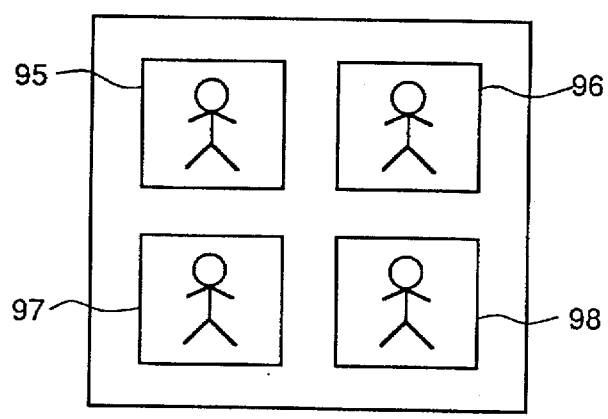
FIG. 10 is a view showing an example of how a preview operation is performed in the embodiment.

In the processing from step S3 to step S8, preview image data corresponding to the characteristics of the three printers connected to this embodiment may be output to display images, as shown in FIGS. 10 or 17.

FIG. 10 shows a case wherein color space compression processes based on the same algorithm and corresponding to the respective printers are performed, and the resultant images are displayed.

More specifically, reference numeral 95 denotes an input image as is; 96, an image having undergone color space compression corresponding to the printer 7; 97, an image having undergone color space compression corresponding to the printer 8; and 98, an image having undergone color space compression corresponding to the printer 9.

FIG. 17 shows a modification of the case shown in FIG. 10. Reference numeral 95 denotes an input image as is; 99, an image corresponding to the printer 7 and having undergone no color space compression; 100, an image corresponding to the printer 8 and having undergone no color space compression; and 101, an image corresponding to the printer 9 and having undergone no color space compression.

According to the case shown in FIG. 10, the user easily selects a printer suitable for an application purpose from a plurality of printers.

According to the case shown in FIG. 17, since images corresponding to the respective printers and having undergone no color space compression are displayed, the user recognizes the output characteristics of the printers on the basis of the display.

As described above, the user determines which printer he/she should use for an image to be formed, or which printer he/she cannot use. Therefore, the user easily selects a printer having output characteristics suitable for an image to be formed without any knowledge about the characteristics of the respective printers.

As described above, this embodiment includes various preview process modes corresponding to various application purposes demanded by the user, as shown in FIGS. 7, 9, 10, and 17.

Figure 18:
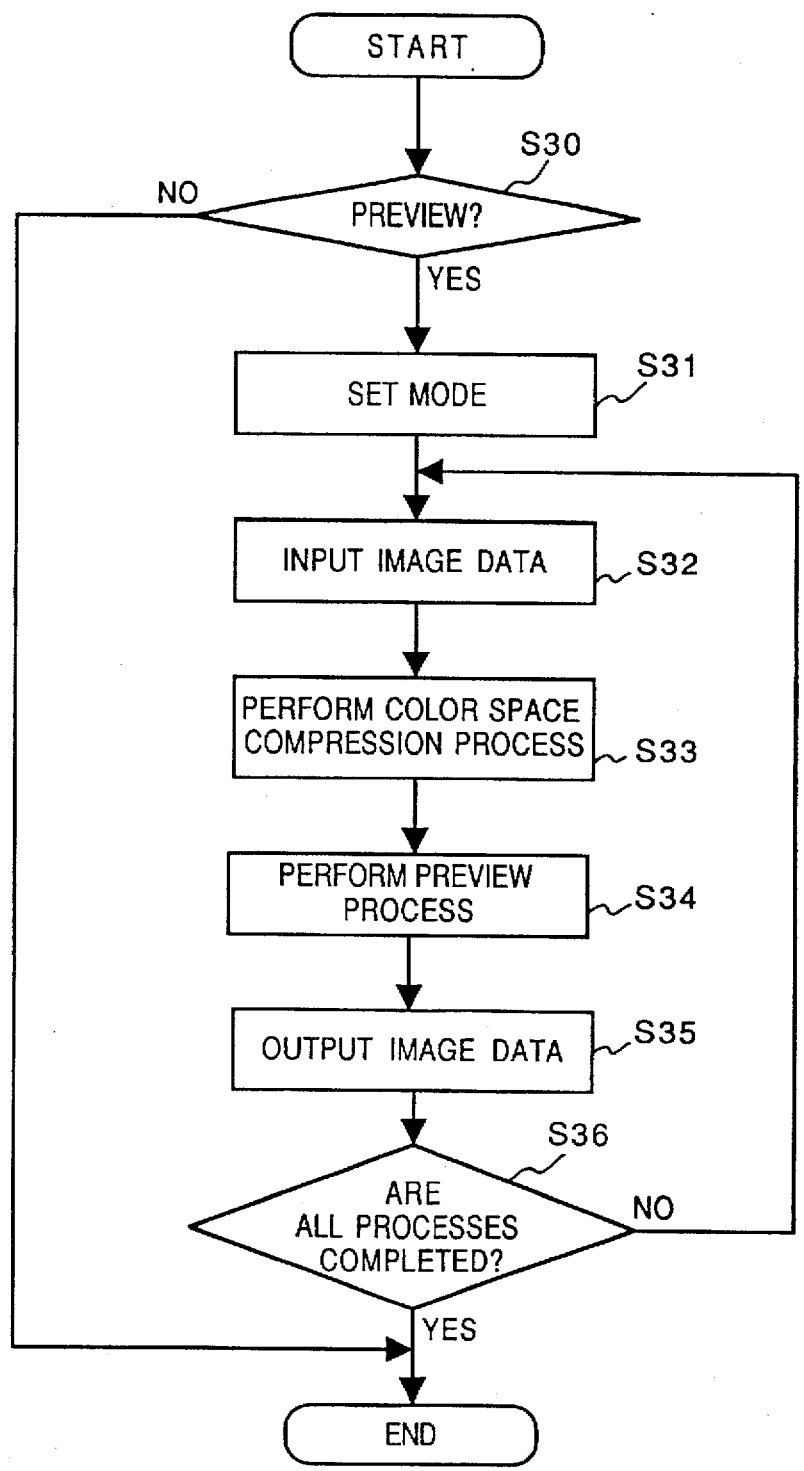
FIG. 18 is a flow chart associated with mode setting in a preview operation.

A procedure for a preview process corresponding to each type of mode is described below with reference to the flow chart shown in FIG. 18.

In step S30, it is checked, on the basis of a command from the operation unit 12, whether a preview process is performed. If YES in step S30, a preview process mode is set on the basis of a command from the operation unit 12 in step S31. In step S32, image data are input. A color space compression process (step S33) corresponding to steps S4 and S5 in FIG. 6 is performed on the basis of the set mode. A preview process (step S35) corresponding to steps S6 and S7 in FIG. 6 is performed, and the resultant image data are output to the monitor (step S35). In step S36, it is checked whether all the processes associated with the set mode are completed. The processing from step S32 to step S36 is repeated until all the processes are completed. If it is determined in step S30 that no preview process is performed, the processing is terminated.

Figures 19, 20:
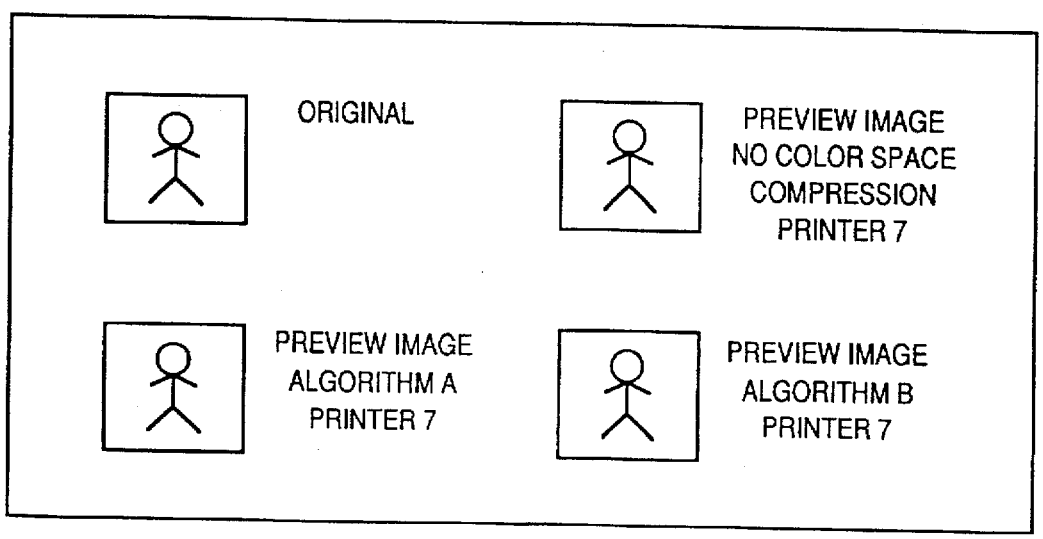
FIG. 19 is a view showing a screen for setting a preview process mode.
FIG. 20 is a view showing a preview screen.

FIG. 19 shows an example of display in designating a preview process mode through the operation unit 12.

The user sets the types of images to be displayed, the types of color space compression processes, and the types of printers to be used with respect to images 1 to 4. In this case, in setting the type of image to be displayed, the user sets either "original image" or "preview image" indicating an image to be output from a printer. In setting the type of printer to be used, the user sets a specific printer for which a preview image is displayed. In setting the type of color space compression process, the user chooses between performing or not performing color space compression and sets a specific algorithm for color space compression. When the compression ratio of a color space compression process is to be changed as shown in FIG. 9, a screen for setting detailed conditions associated with color space compression is used.

Figure 11:
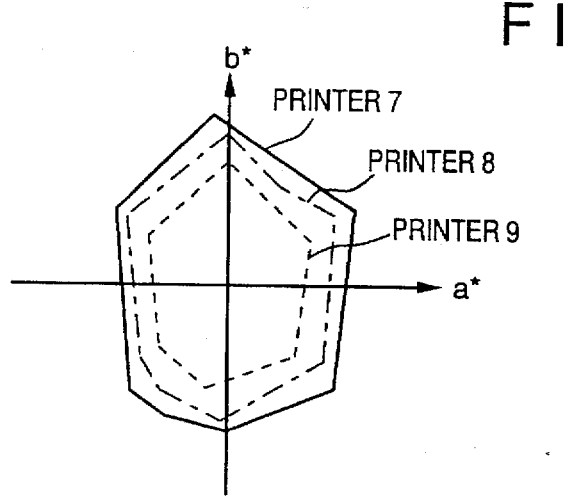
FIG. 11 is a view showing the difference in color reproduction range between printers.

In addition, as shown in FIG. 11, the color reproduction ranges of the respective printers is displayed on the basis of the color reproduction range data on the printers which are stored in the hard disk 10 in FIG. 1.

More specifically, if a color reproduction range is defined by eight points as in this embodiment, a color reproduction range like the one shown in FIG. 3 is obtained by interpolation using the eight points. For example, an origin is then set at $L^*=50$ and $a^*, b^*=0$, and vertexes nearest to the origin are selected, thereby displaying a color reproduction range.

That is, an equi-luminance plane for $L^*=50$ is displayed.

The narrowest color reproduction range may be selected from the color reproduction ranges of the respective printers, shown in FIG. 11, and color space compression corresponding to the selected range may be performed.

By outputting images from the printers 7 to 9 on the basis of image data having undergone the color space compression thus selected, the images output from the respective printers are made identical to each other.

That is, color space compression is set in such a manner that any types of printers output images having the same color appearance.

Figure 12:
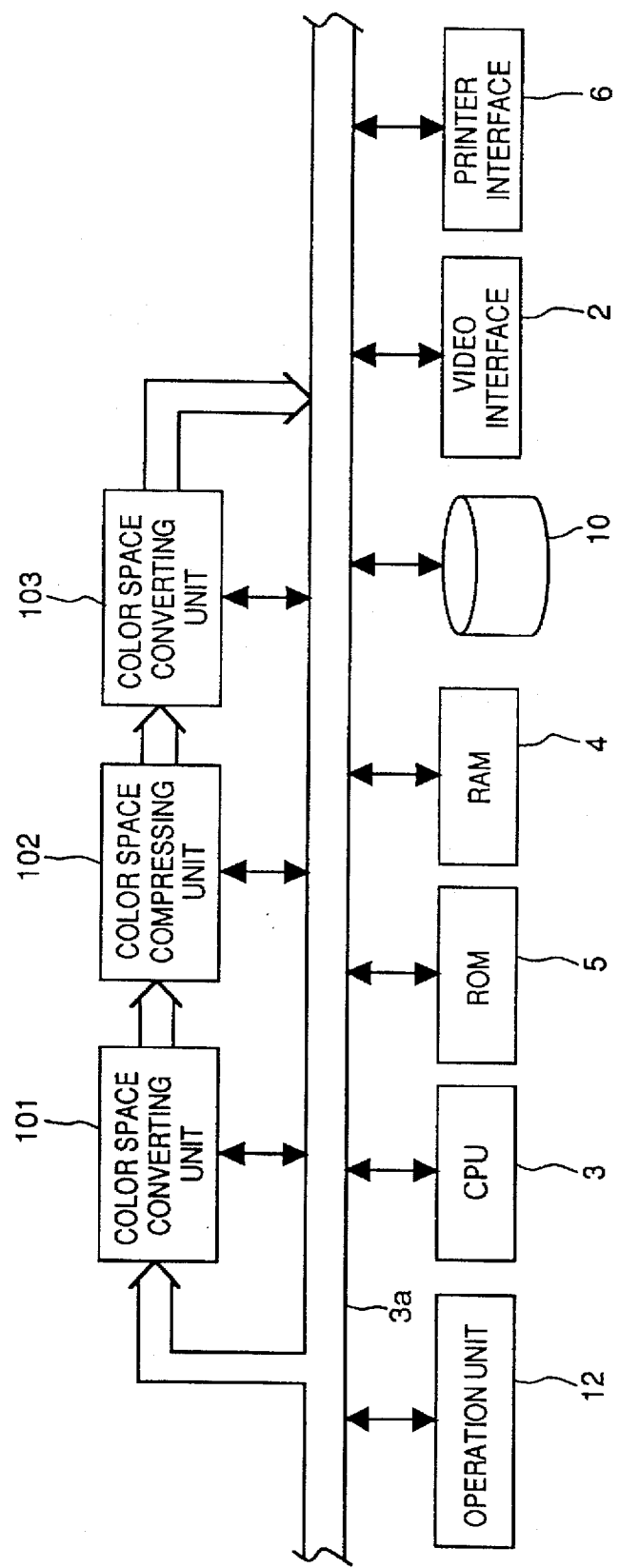
FIG. 12 is a block diagram showing an example of hardware implementing the processing shown in FIG. 6.

FIG. 12 is a block diagram showing an example of hardware equivalent to the processing shown in FIG. 6. This hardware is designed to increase the processing speed by performing color space conversion and color space compression processes according to a pipeline scheme.

Reference numeral 101 denotes a color space converting unit for converting the RGB color space of image data input via the bus 3a into an $L^*a^*b^*$ color space; 102, a color space compressing unit for performing color space compression set by the CPU 3 with respect to the $L^*a^*b^*$ image data directly input from the color space converting unit 101; and 103, a color space converting unit for converting the $L^*a^*b^*$ color space of the image data directly input from the color space converting unit 101 into an RGB color space and outputting the resultant data to the bus 3a. These converting units and the compressing unit perform the respective processes by using three-dimensional look-up tables and performing matrix calculations. Note that color space compression and color space conversion may be performed by using one three-dimensional look-up table.

The printers 7 to 9 are of a sublimation, thermal transfer, electrophotographic, or ink-jet type. However, the present invention is not limited to this. For example, a printer having a head of a type designed to cause film boiling by means of heat energy and discharging ink droplets, and a recording method using this printer may be employed. Alternatively, a printer for outputting a gray scale image may be used. In this case, color space compression (lightness compression) is performed on the $L^*$-axis.

As the monitor 1, any type of display such as a CRT, a LCD, or a plasma display can be used as long as it displays a color image. In the above embodiment, four images are displayed on the monitor 1. However, more or fewer images may be displayed, and images having undergone the above processes may be arbitrarily combined and displayed together.

In addition, the color space of image data in performing color space compression is not limited to an $L^*a^*b^*$ color space. For example, an $L^*u^*v^*$ or XYX color space may be employed.

Furthermore, in displaying preview images, the respective modes may be simultaneously displayed, as shown in FIG. 20.

As described above, images obtained by performing different color space compression processes with respect to the same input image data are simultaneously output as visually recognizable image data. Therefore, a preview function can be provided, which allows the user to form an image having a desired color appearance.

In addition, images obtained by performing preview processes corresponding to different image forming apparatuses with respect to the same input image data are simultaneously output as visually recognizable image data. Therefore, a preview function is provided, which allows the user to form an image having a desired color appearance.

<Second Embodiment>

An image processing apparatus according to the second embodiment of the present invention is described below. The same reference numerals in the second embodiment denote the same parts as in the first embodiment, and a detailed description thereof is omitted.

Figure 13:
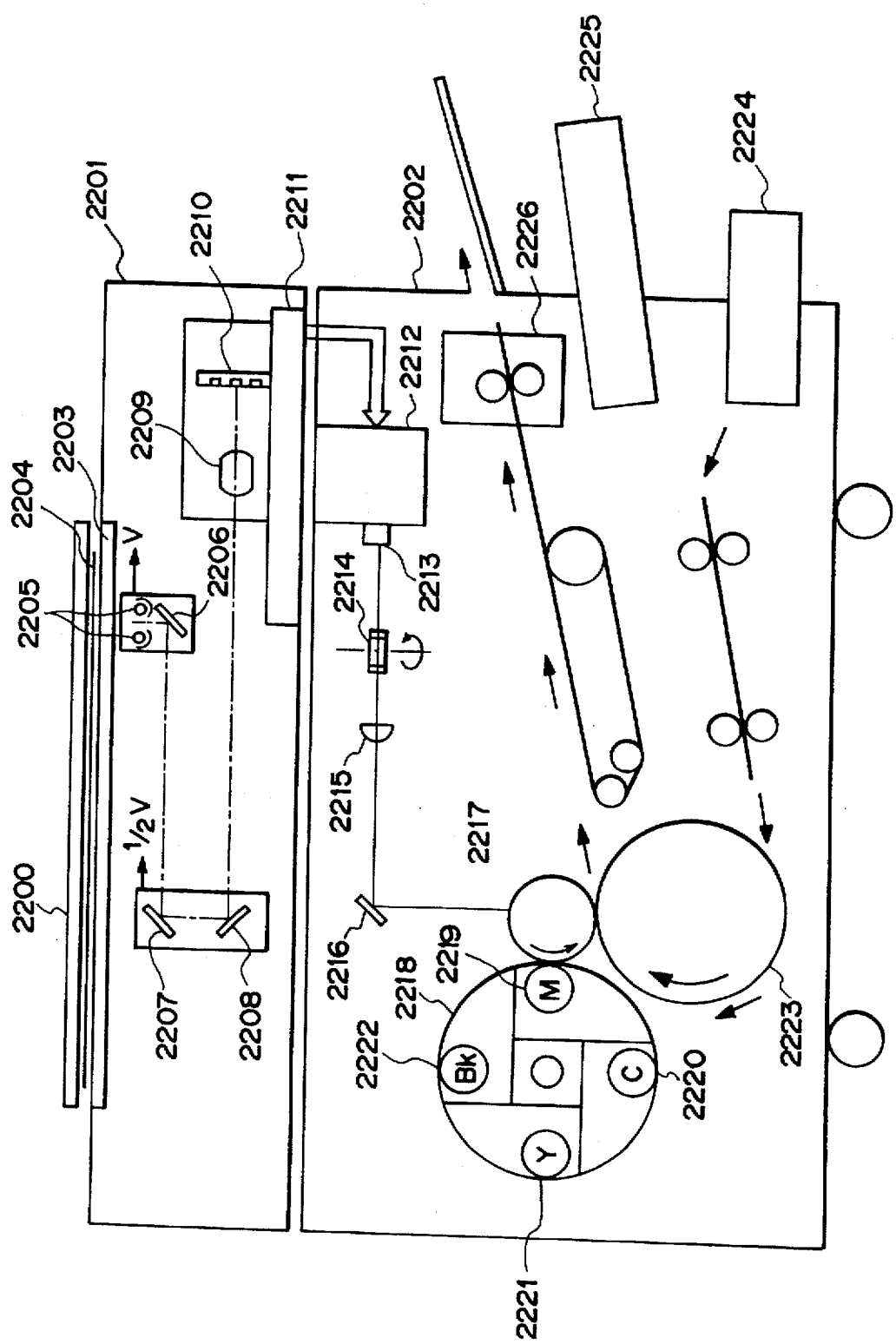
FIG. 13 is a schematic view showing an image forming apparatus including an image processing apparatus according to the second embodiment of the present invention.

FIG. 13 is a schematic view showing an image forming apparatus including an image processing apparatus according to the second embodiment of the present invention.

Referring to FIG. 13, reference numeral 2201 denotes an image scanner for reading an original image and performing digital signal processing; and 2202, a printer for printing an image corresponding to the original image read by the image scanner 2201, as a full-color image, on a recording sheet.

In the image scanner 2201, an original 2204 clamped between a mirror press plate 2200 and an original table glass 2203 is illuminated by a lamp 2205. Light reflected by the original 2204 is guided to mirrors 2206 to 2208, and forms an image on a three-line sensor 2210 via a lens 2209. The three-line sensor 2210 is constituted by a color separation filter and a CCD. The three-line sensor 2210 separates the input reflected light into R, G, and B components of full-color information, and supplies R, G, and B signals representing the light intensities of the respective components to a signal processing unit 2211. Note that the lamp 2205 and the mirror 2206 mechanically move at a velocity V in a direction perpendicular to the electrical scanning (main scanning) direction of the three-line sensor 2210, and the mirrors 2207 and 2208 also mechanically move at a velocity V/2 in the same direction, thereby scanning (sub-scanning) the entire surface of the original 2204. The read original image data is sent to the signal processing unit 2211.

The image signal input to the signal processing unit 2211 is electrically processed to form one of C, M, Y, and Bk components. The formed component is sent to the printer 2202. That is, all the C, M, Y, and Bk components are formed by a total of four scanning operations of the image scanner 2201. These components are sent to the printer 2202 to complete one printout operation.

The image signal input to the printer 2202 is supplied to a laser driver 2212. The laser driver 2212 drives a semiconductor laser 2213 to modulate its output in accordance with the supplied image signal. A laser beam emitted from the semiconductor laser 2213 scans over a photosensitive drum 2217 via a polygonal mirror 2214, a f-θ lens 2215, and a mirror 2216 so as to form a latent image.

Reference numeral 2218 denotes a rotating developer, which comprises a magenta developing unit 2219, a cyan developing unit 2220, a yellow developing unit 2221, and black developing unit 2222. The four developing units are brought into contact with the photosensitive drum 2217 in a predetermined order to develop the latent image formed on the photosensitive drum 2217 with toners of the respective colors.

Reference numeral 2223 denotes a transfer drum. A recording sheet fed from a recording sheet cassette 2224 or 2225 is wound around the transfer drum 2223, and the toner image developed on the photosensitive drum 2217 is transferred to the recording sheet.

The recording sheet, on which the toners of the four colors, i.e., M, C, Y, and Bk are sequentially transferred in this manner, is discharged after it passes through a fixing unit 2226 to fix the toners.

Figure 14:
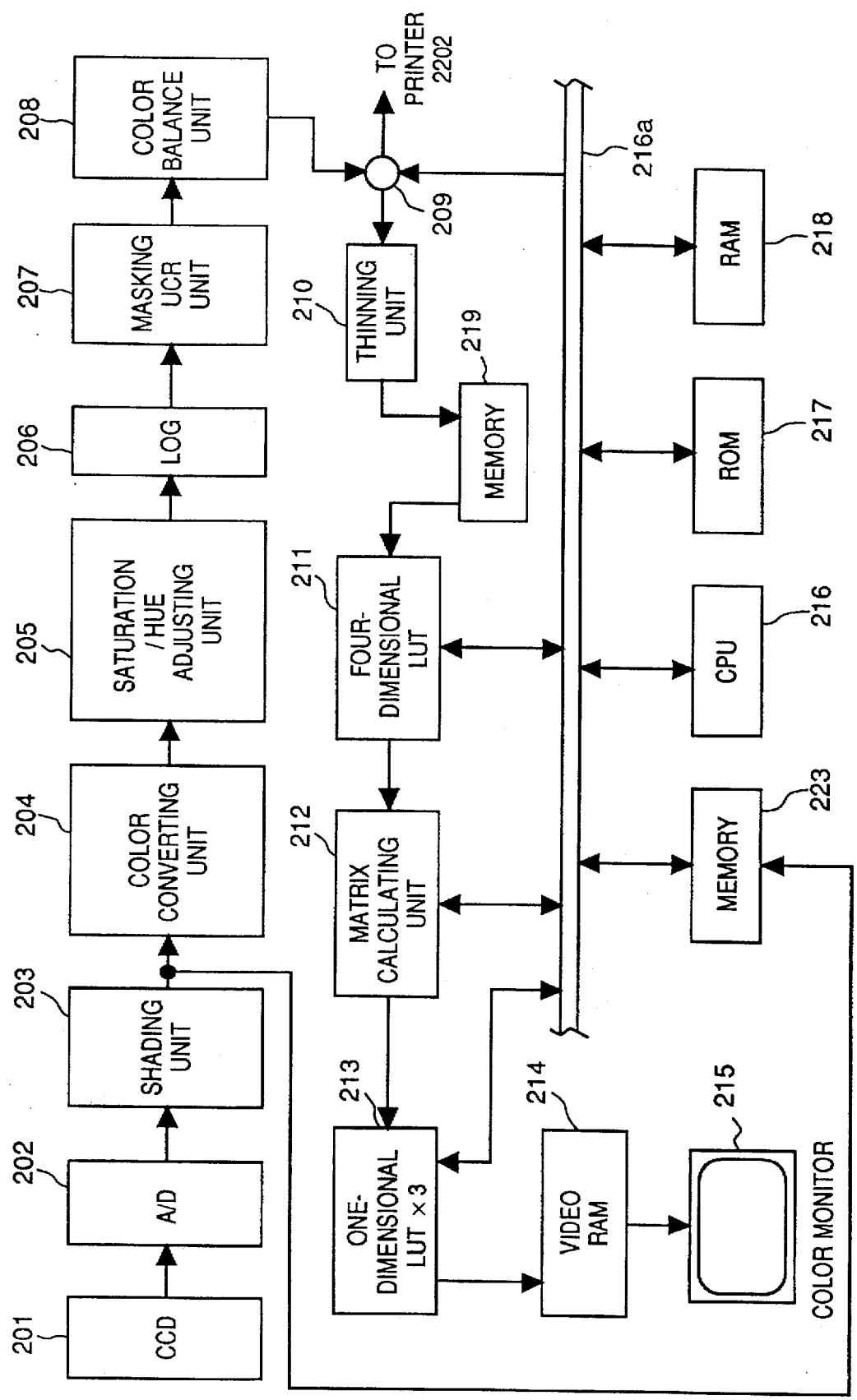
FIG. 14 is a block diagram showing the detailed arrangement of the signal processing unit in FIG. 13.

FIG. 14 is a block diagram showing the detailed arrangement of the signal processing unit 2211.

Referring to FIG. 14, a CPU 216 controls other blocks (to be described later) via a bus 216a in accordance with programs and the like stored in a ROM 217, and executes processing (to be described later) by using a RAM 218 as a work memory. Output characteristic data on the printer 2202 and a monitor 215, such as color reproduction range data, are stored in the ROM 217 in advance.

Image signals output from a CCD 201 constituting the three-line sensor 2210 are converted into digital signals of the respective colors, each consisting of, e.g., eight bits, by an A/D converter 202. A shading unit 203 then performs correction of illumination irregularity associated with the lamp 2205 and sensitivity irregularity associated with the CCD 201. The R, G, and B image signals output from the shading unit 203 are converted into signals having color appearances designated by the user by means of a color converting unit 204 and a saturation/hue adjusting unit 205. After these signals are converted into M, C, and Y image signals by a logarithmic converting unit 206, the signals are further subjected to masking processing and UCR in a masking UCR unit 207 so as to be converted into Y, M, C, and Bk image signals. In addition, the image signals are converted into signals having a color balance designated by the user by means of a color balance unit 208. Thereafter, in a normal copy operation, the resultant signals are supplied to the printer 2202 via a switch 209.

In a preview operation, an output from the color balance unit 208 is supplied to a thinning unit 210 via the switch 209, and image data reduced in scale by a predetermined thinning process is stored in a memory 219. Y, M, C, and Bk image data stored in the memory 219 after four read operations are converted into R, G, and B signals corresponding to read image signals (outputs from the shading unit 203) by a four-dimensional look-up table (to be referred to an LUT hereinafter) 211.

The image signals output from the four-dimensional LUT 211 are converted into image signals for a monitor by a 3×3 matrix calculating unit 212. Gamma correction of the signals is further performed by three one-dimensional LUTs 213 for R, G, and B. The resultant signals are stored in a video RAM 214 and displayed on a monitor 215. Note that matrix coefficients in the matrix calculating unit 212 are set on the basis of the chromaticity and color temperature data on the phosphors of the monitor 215, which are obtained in advance, and data read, by the image scanner 2201, from an original whose chromaticity is known.

The user sets processing conditions and parameters in, e.g., the color balance unit 208 to form an image having a desired color appearance on the basis of images displayed on the monitor 215.

A table in the four-dimensional LUT 211 is set by a CPU 216. This procedure is described below.

First of all, the CPU 216 reads out patch data from a ROM 217 to print patches like those shown in FIG. 15 by using the printer 2202. Solids having different colors are respectively formed in portions indicated by "□" in FIG. 15. FIG. 16 shows combinations of Y, M, C, and Bk data for forming the different colors. In this case, each color component has nine levels, and a total of 6,561 patches are formed.

As described above, Y, M, C, and Bk signals input to the four-dimensional LUT 211 are obtained by processing R, G, and B signals read by the image scanner 2201 and corrected by the shading unit 203. For this reason, a table in the four-dimensional LUT 211 is set on the basis of outputs from the shading unit 203 (corresponding to output signals from the four-dimensional LUT 211) which are obtained from patches (corresponding to input signals to the four-dimensional LUT 211) formed by the printer 2202. Therefore, when the patches shown in FIG. 15 are printed, they are read by the image scanner 2201. The CPU 216 then stores the outputs from the shading unit 203 in a memory 223, and sets a table in the four-dimensional LUT 211 on the basis of the R, G, and B values of the respective patches.

Note that the CPU 216 obtains R, G, and B values of other levels by interpolation on the basis of, e.g., the R, G, and B values obtained from the patches consisting of color components each having nine levels, and sets table data. In addition, if matrix calculation performed by the matrix calculating unit 212 is performed with respect to the table data obtained from the patches, and the resultant data is set in the four-dimensional LUT 211, the four-dimensional LUT 211 and the matrix calculating unit 212 may be integrated into one unit. In addition, if the interval of a thinning process performed by the thinning unit 210 is shortened (the amount of data to be thinned out is reduced), the four-dimensional LUT 211 and the one-dimensional LUTs 213 may be integrated into one unit.

As described above, according to this embodiment, a preview operation is performed by converting image formation signals into signals corresponding to image-read signals. Therefore, the color appearance of an image to be formed is faithfully reproduced.

In the above embodiment, the memory 223 may be used as an image memory. More specifically, image data obtained by reading an original image are stored in the shading unit 203, and M component data is formed. Subsequently, the image data stored in the shading unit 203 are read out to sequentially form C, Y, and Bk component data. With this operation, the original is read by only one scanning operation.

Referring to FIG. 14, the memory 219 and the memory 223 are arranged separately. It is, however, apparent that the two memories may be integrated into one memory, or one memory may be divided to be assigned to the two memory functions.

In the above embodiment, as algorithms for color space compression, color space compression processes for narrowing the color reproduction ranges are used. However, the present invention is not limited to this. For example, a color space compression process for broadening the color reproduction range may be used when, for example, an image is to be displayed on an image display apparatus such as a monitor on the basis of image data from an image forming apparatus such as a printer.

Note that the present invention may be applied to a system constituted by a plurality of devices or an apparatus constituted by one device.

In addition, as is apparent, the present invention may be applied to a case wherein the above-described functions are attained by supplying programs to a system or an apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting color image data representing an input color image;
   color gamut mapping means for performing a color gamut mapping on the color image data, based on one of a plurality of color gamut mapping methods;
   generating means for generating color image data representing a preview image corresponding to an output image reproduced by a color image forming unit; and
   control means for performing control so as to simultaneously display preview images, on which the color gamut mapping has been performed based on the plurality of color gamut mapping methods, and a preview image, on which the color gamut mapping has not been performed, with respect to the same color image data.

2. The apparatus according to claim 1, further comprising display means for displaying the plurality of preview images on one screen.

3. The apparatus according to claim 2, further comprising:
   selecting means for selecting one of the plurality of preview images; and
   output means for performing color gamut mapping corresponding to the preview image selected by said selecting means, and outputting the color image data, on which the color gamut mapping has been performed, to the color image forming unit.

4. The apparatus according to claim 3, further comprising an image forming unit for forming an output image on a recording medium.

5. The apparatus according to claim 1, wherein said control means further performs control so as to simultaneously display an original image, based on the input color image data, which has not been generated by said preview means.

6. The apparatus according to claim 1, wherein said color gamut mapping means maps the color image data within a color gamut of the color image forming unit.

7. The apparatus according to claim 1, wherein said color gamut mapping means matches a color gamut of the input color image with a color gamut of the color image forming unit.

8. The apparatus according to claim 1, wherein said color gamut mapping means maps the color a target color gamut, and the target color gamut of each of said plurality of color gamut mapping methods are different from each other.

9. The apparatus according to claim 1, wherein said color gamut mapping means converts color image data within a color gamut of the color image forming unit.

10. An image processing apparatus comprising:
    preview processing means for performing a preview process on input image data, the process including color gamut mapping according to a color gamut of an image forming unit;
    output means for outputting a plurality of preview images obtained by performing different preview processes corresponding to different image forming units on the same input image data, so as to simultaneously visually confirm the plurality of preview images; and
    selecting means for selecting a desired preview image from the plurality of preview images.

11. The apparatus according to claim 10 further comprising display means for displaying the plurality of preview images on one screen.

12. The apparatus according to claim 10, wherein said output means further outputs the input image data so as to simultaneously visually confirm an original image in addition to the plurality of preview images.

13. The apparatus according to claim 10, further comprising an image forming unit for forming an output image on a recording medium.

14. The apparatus according to claim 10, wherein said color gamut mapping converts the input image data within the color gamut of the image forming unit.

15. An image processing method comprising:

an input step of inputting color image data representing an input color image;

a color gamut mapping step of performing a color gamut mapping on the color image data, based on one of a plurality of color gamut mapping methods;

a generating step of generating color image data representing a preview image corresponding to an output image reproduced by a color image forming unit; and a control step of performing control so as to simultaneously display preview images, on which the color gamut mapping has been performed based on the plurality of color gamut mapping methods, and a preview image, on which the color gamut mapping has not been performed, with respect to the same color image data.

16. The method according to claim 15, further comprising a display step of displaying the plurality of preview images on one screen.

17. The method according to claim 16, further comprising:

a selecting step of selecting one of the plurality of preview images; and an output step of performing color gamut mapping corresponding to the preview image selected at the selecting step, and outputting the color image data, on which the color gamut mapping has been performed, to the color image forming unit.

18. The method according to claim 17, further comprising an image forming step of forming an output image on a recording medium.

19. The method according to claim 15, wherein at the control step, control is further performed so as to simultaneously display an original image, based on the input color image data, which has not been generated at the preview step.

20. The method according to claim 15, wherein at the color gamut mapping step, the color image data is mapped within a color gamut of the color image forming unit.

21. The method according to claim 15, wherein at the color gamut mapping step, a color gamut of the input color image is matched with a color gamut of the color image forming unit.

22. The method according to claim 15, wherein in the color gamut mapping step, the color image data is mapped into a target color gamut, and the target color gamut of each of said plurality of color gamut mapping methods are different from each other.

23. The method according to claim 15, wherein at the color gamut mapping step, color image data is converted within a color gamut of the color image forming unit.

24. An image processing method comprising:

a preview processing step of performing a preview process on input image data, the process including color among mapping according to a color gamut of an image forming unit;

an output step of outputting image data, corresponding to a plurality of preview images, obtained by performing different preview processes corresponding to different image forming units on the same input image data, so as to simultaneously visually confirm the plurality of preview images; and a selecting step of selecting a desired preview image from the plurality of preview images.

25. An image processing apparatus comprising:

input means for inputting color image data representing a color image;

setting means for manually setting process conditions respectively corresponding to a plurality of preview images;

color matching means for performing color matching processing on the color image data, based on the process conditions;

preview processing means for performing preview processing on the color image data on which the color matching process has been performed by said color matching means, based on a characteristic of a color image output unit, and generating preview image data representing the plurality of preview images; and control means for performing control so as to simultaneously display the plurality of preview images.

26. The apparatus according to claim 25, wherein the process conditions include a condition regarding a color gamut mapping method.

27. The apparatus according to claim 25, wherein the process conditions include a type of the color image output unit.

28. The apparatus according to claim 25, further comprising selecting means for selecting a desired preview image from the plurality of preview images processed in the preview processes.

29. An image processing method comprising:

an input step of inputting color image data representing a color image;

a setting step of manually setting process conditions respectively corresponding to a plurality of preview images;

a color matching step of performing color matching processing on the color image data, based on the process conditions;

a preview processing step of performing preview processing on the color image data on which the color matching process has been performed at the color matching step, based on a characteristic of a color image output unit, and generating preview image data representing the plurality of preview images; and a control step of performing control so as to simultaneously display the plurality of preview images.

* * * * *

UNITED STATES PATENT AND TRADEMARK OFFICE
CERTIFICATE OF CORRECTION

PATENT NO. : 5,748,342

DATED : May 5, 1998

INVENTOR : AKIHIRO USAMI

It is certified that error appears in the above-identified patent and that said Letters Patent is hereby corrected as shown below:

```
IN THE DRAWING

Sheet 2 of 14   "PRINER" should read --PRINTER--.

COLUMN 1 line 24,   "arts." should read --art.--.

COLUMN 5 line 21,   "they" should be deleted; and
  line 22,   "are;" should read --is;--.

COLUMN 6 line 13,   "step" should read --in step--;
  line 19,   "a color" should read --on a color--.
```

UNITED STATES PATENT AND TRADEMARK OFFICE
CERTIFICATE OF CORRECTION

PATENT NO. : 5,748,342

DATED : May 5, 1998

INVENTOR : AKIHIRO USAMI

It is certified that error appears in the above-identified patent and that said Letters Patent is hereby corrected as shown below:

COLUMN 8 line 17,   "types" should read --type--.

COLUMN 12 line 44,   "a target" should read --image data within a target--.

Signed and Sealed this

Twenty-fourth Day of November, 1998

Attest:

BRUCE LEHMAN

Attesting Officer      Commissioner of Patents and Trademarks